US008544843B2

(12) United States Patent
Matsumoto (10) Patent No.: US 8,544,843 B2
(45) Date of Patent: Oct. 1, 2013

(54) PAPER TRANSPORT DEVICE, DOCUMENT READING APPARATUS PROVIDED WITH THE SAME, AND IMAGE FORMING APPARATUS PROVIDED WITH THE SAME

(75) Inventor: Kazutaka Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/411,165

(22) Filed: Mar. 2, 2012

(65) Prior Publication Data
US 2012/0242036 A1 Sep. 27, 2012

(30) Foreign Application Priority Data

Mar. 23, 2011 (JP) ................................. 2011-064121

(51) Int. Cl.
*B65H 9/04* (2006.01)
(52) U.S. Cl.
USPC ............................ 271/242; 271/227; 271/228
(58) Field of Classification Search
USPC ......................................... 271/227, 228, 242
See application file for complete search history.

(56) References Cited

U.S. PATENT DOCUMENTS

| 7,305,209 | B2 | 12/2007 | Takata et al. | |
|---|---|---|---|---|
| 7,637,500 | B2 * | 12/2009 | Schalk et al. | 271/242 |
| 8,292,293 | B2 * | 10/2012 | Inoue | 271/227 |
| 8,308,158 | B2 * | 11/2012 | Hirota | 271/227 |
| 2004/0240916 | A1 | 12/2004 | Takata et al. | |
| 2009/0066016 | A1 * | 3/2009 | Kato et al. | 271/227 |
| 2010/0013149 | A1 * | 1/2010 | Kondo | 271/228 |

FOREIGN PATENT DOCUMENTS

| JP | 8-305098 A | 11/1996 |
|---|---|---|
| JP | 2001-039584 A | 2/2001 |
| JP | 2004-131190 A | 4/2004 |
| JP | 2004-352402 A | 12/2004 |
| JP | 2005-104640 A | 4/2005 |

\* cited by examiner

*Primary Examiner* — Kaitlin Joerger
(74) *Attorney, Agent, or Firm* — Birch, Stewart, Kolasch & Birch, LLP (57) ABSTRACT

A first resist roller (72) and a second resist roller (75) are disposed in a transport path of paper on an upstream side and a downstream side in the transport direction of the paper, and the rotational speeds of the first resist roller (72) and the second resist roller (75) are controlled so that the leading edge of the paper butts against and stops at the first resist roller (72) and the second resist roller (75), after which the paper is transported by the first and second resist rollers (72, 75) and the angled travel of the paper is corrected. An angled travel detection unit (81, 82) that detects angled travel in the paper is disposed upstream from the first resist roller (72) in the transport direction of the paper.

12 Claims, 6 Drawing Sheets

PAPER TRANSPORT DEVICE, DOCUMENT READING APPARATUS PROVIDED WITH THE SAME, AND IMAGE FORMING APPARATUS PROVIDED WITH THE SAME

CROSS-REFERENCES TO RELATED APPLICATIONS

This application claims priority under 35 U.S.C. §119(a) on Patent Application No. 2011-064121, filed in Japan on 23 Mar. 2011, the contents of which are incorporated herein in their entirety.

BACKGROUND OF THE INVENTION

1. Field of the Invention

The present invention relates to the paper transport devices that transport paper, and to document reading apparatuses and image forming apparatuses provided with such paper transport devices.

2. Description of the Related Art

Some document reading apparatuses read images on documents while transporting the documents using a paper transport device. Furthermore, some image forming apparatuses copy an image of a document read by a document reading apparatus onto recording paper by printing the image onto the recording paper while transporting the recording paper using a paper transport device.

If, in such a document reading apparatus, the document is transported at an angle relative to the correct paper transport direction, the document image will be read at that angle. A document being transported at an angle relative to the correct paper transport direction will also be referred to as "angled travel" or "traveling at an angle" hereinafter.

If a recording paper travels at an angle, the image forming apparatus will record the image onto the recording paper at a corresponding angle. Accordingly, a resist roller is provided in the paper transport path of paper transport devices that transport documents, recording paper, and so on. By controlling the rotational speed of the resist roller, the leading edge of the paper butts against the resist roller and stops, which causes the paper to flex. The leading edge of the paper is aligned parallel with the resist roller due to the repulsive force of the paper. After the angled travel of the paper has been corrected in this manner, the paper is transported by the resist roller. The resist roller begins transporting the paper in tandem with the timing at which the image of the document is read, the timing at which the image is transferred onto recording paper, or the like, after the resist roller has been temporarily stopped.

JP-2001-39584A (Patent Document 1) discloses detecting an angled travel amount of paper using a pre-resist sensor and adjusting the operating timing of the resist roller, or in other words, the timing at which the resist roller begins transporting the paper, based on the detected angled travel amount.

Incidentally, in recent years, there have been significant increases in the printing speeds of image forming apparatuses, and the speeds at which documents, recording paper, and so on are transported have also increased as a result. However, when the speed at which paper is transported is increased, there is a problem in that angled travel of paper cannot be completely corrected through a single correction performed by the resist roller.

Therefore, for example, first and second resist rollers have been disposed at a distance from each other in the paper transport path on the upstream and downstream sides in the paper transport direction, and angled travel of the paper has been corrected favorably by first correcting the angled travel of the paper using the first resist roller and then once again correcting the angled travel of the paper using the second resist roller.

However, in the case where the first and second resist rollers are provided, the leading edge of the paper butts against and stops at both the first and second resist rollers. This causes the transport speed of the paper to decrease at both the first and second resist rollers. This has therefore interfered with increases in the transport speed of the paper.

Even with the technique disclosed in Patent Document 1, the transport speed of the paper decreases. Patent Document 1 discloses not stopping the resist roller when the paper experiences a low amount of angled travel. However, in this case, the operations described earlier, in which the resist roller first stops temporarily and then begins to transport the paper in accordance with the timing at which the image of the document is read, the timing at which the image is transferred onto recording paper, or the like, will not be carried out. In other words, there is a problem in that one of the functions of the resist roller is impaired.

SUMMARY OF THE INVENTION

Having been achieved in light of the aforementioned conventional problems, it is an object of the present invention to provide a paper transport device that can favorably correct angled travel in paper using first and second resist rollers, that does not interfere with an increase in the transport speed of paper, and that does not impair the functionality of the resist rollers, and to provide a document reading apparatus and an image forming apparatus provided with such a paper transport device.

In order to solve the aforementioned problems, according to a paper transport device of the present invention, first and second resist rollers are disposed in a transport path of paper on an upstream side and a downstream side in the transport direction of the paper, with a distance between the first resist roller and the second resist roller, and the rotational speeds of the first and second resist rollers are controlled so that the leading edge of the paper butts against and stops at each of the first and second resist rollers, after which the paper is transported by the first and second resist rollers and the angled travel of the paper is corrected. The paper transport device further includes an angled travel detection unit that is disposed upstream from the first resist roller in the transport direction of the paper and that detects angled travel in the paper, and a control unit that controls the rotational speed of the first resist roller so that the paper is transported so that the paper does not stop even when the leading edge of the paper butts against the first resist roller when angled travel has not been detected in the paper by the angled travel detection unit.

According to the paper transport device of the present invention, the rotational speed of the first resist roller is controlled so that the paper is transported without the leading edge of the paper butting against and stopping at the first resist roller when angled travel has not been detected in the paper by the angled travel detection unit, which is located upstream from the first resist roller in the paper transport direction. Accordingly, when the paper is not traveling at an angle, the transport speed of the paper is not reduced by the first resist roller.

Furthermore, because the rotational speed of the second resist roller is continually controlled so that the paper is transported after the leading edge of the paper butting against and stopping at the second resist roller, the transport of the paper can be started in correspondence with the timing of the start of processes carried out on the paper downstream from the second resist roller. For example, the second resist roller begins transporting the paper in correspondence with the timing at which an image of a document is read, the timing at which an image is transferred onto recording paper, or the like.

Accordingly, as long as the paper does not travel at an angle, the transport speed of the paper does not decrease in the vicinity of the first resist roller, and the original function of the resist roller pairs is fulfilled only by the second resist roller; a drop in the transport speed of the paper can be suppressed to approximately the same degree as when only a single resist roller is provided, which makes it easy to increase the transport speed of the document.

In addition, in the paper transport device according to the present invention, it is preferable for the configuration to be such that when angled travel has been detected in the paper by the angled travel detection unit, the control unit controls the rotational speeds of the first and second resist rollers so that the paper stops when the leading edge of the paper butts against the first and second resist rollers and is then transported.

Through this, angled travel in the paper can be corrected favorably by the first and second resist rollers.

Furthermore, in the paper transport device according to the present invention, it is preferable for the angled travel detection unit to include a first paper sensor and a second paper sensor, disposed at a distance from each other in a direction orthogonal to the transport direction of the paper, that each detect the leading edge of the paper.

The first and second paper sensors detect at respective timings the leading edge of the paper, which extends in the direction orthogonal to the paper transport direction. Meanwhile, the timing at which the leading edge of the paper is detected by the first and second paper sensors changes depending on the size of the angle of the leading edge of the paper. For this reason, whether or not the paper is traveling at an angle can be detected based on the timings at which the leading edge of the paper is detected by the first and second image sensors, respectively.

In addition, in the paper transport device according to the present invention, it is preferable for angled travel to be detected in the paper based on a difference between the timing at which the leading edge of the paper is detected by the first paper sensor and the timing at which the leading edge of the paper is detected by the second paper sensor.

The difference between the detection timings of the leading edge of the paper as detected by the first and second paper sensors increases as the angle of the leading edge of the paper increases. For this reason, angled travel can be detected in the paper based on differences between the stated detection timings.

Furthermore, in the paper transport device according to the present invention, it is preferable for the detection of angled travel in the paper to be invalidated when a difference between the timings at which the leading edge of the paper is detected by the first and second paper sensors is greater than a specified value.

In the case where the angle of the leading edge of the paper has become too high, the difference between the timings at which the first and second paper sensors detect the leading edge of the paper will become extremely high. In addition, the difference between the timings at which the first and second paper sensors detect the leading edge of the paper will become extremely high in the case where a detection error has occurred in the first and second paper sensors. In either case, the angled travel the document cannot be properly corrected based on the detection timings of the first and second paper sensors, and therefore it is preferable to invalidate the detection of angled travel in the paper when the difference between those detection timings has exceeded the specified value.

Meanwhile, a document reading apparatus according to the present invention includes the aforementioned paper transport device according to the present invention. Furthermore, an image forming apparatus according to the present invention includes the aforementioned paper transport device according to the present invention.

The same actions and effects as those of the aforementioned paper transport device according to the present invention can be achieved by the document reading apparatus and image forming apparatus according to the present invention.

DETAILED DESCRIPTION OF THE INVENTION

Hereinafter, an embodiment of the present invention will be described with reference to the drawings.

Figure 1:
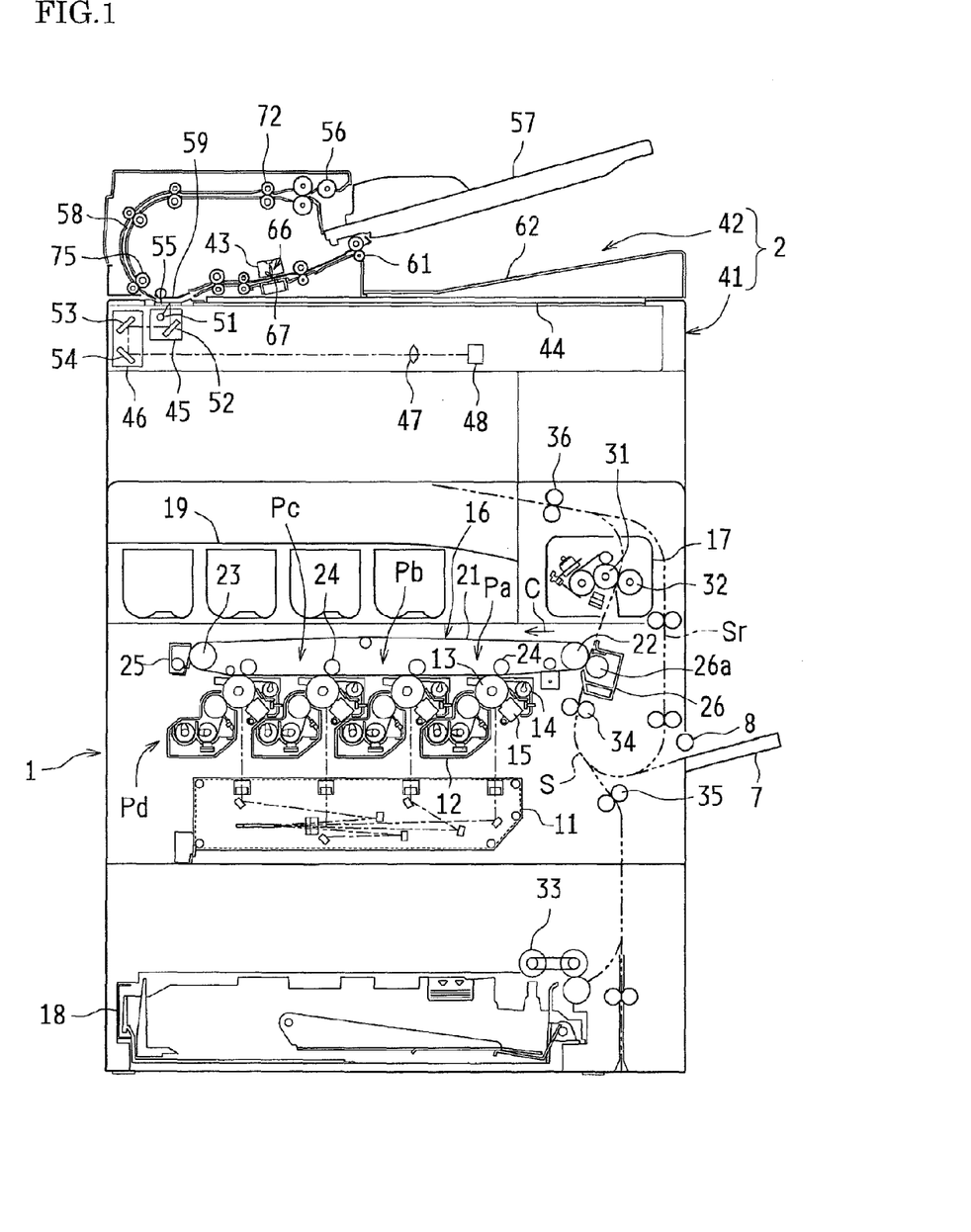
FIG. 1 is a schematic diagram illustrating an image forming apparatus provided with a document reading apparatus in which is applied an embodiment of a paper transport device according to the present invention.

An image forming apparatus 1 shown in FIG. 1 is what is known as a multi-function peripheral that includes a scanner function, a copying function, a printer function, a facsimile function, and so on. The image forming apparatus 1 transmits images of documents read by a document reading apparatus 2 to the exterior, records images of the read documents or images received from the exterior onto recording paper in full color or with a single color, and so on.

The image forming apparatus 1 includes: a laser exposure unit 11; developing units 12; photosensitive drums 13; cleaning units 14; chargers 15; an intermediate transfer belt unit 16; a fixing unit 17; a paper transport path S; a paper supply tray 18; a paper discharge tray 19; and so on.

The image data handled by the image forming apparatus 1 corresponds to color images that use black (K), cyan (C), magenta (M), and yellow (Y) colors, or to monochromatic images that use a single color (for example, black). For this reason, four each of the developing units 12, photosensitive drums 13, cleaning units 14, and chargers 15 are provided in order to form four types of toner images corresponding to the respective colors, and these units configure four image stations Pa, Pb, Pc, and Pd for black, cyan, magenta, and yellow, respectively.

Each of the photosensitive drums 13 has a photosensitive layer on its surface. The chargers 15 are charging units for uniformly charging the surfaces of the corresponding photosensitive drums 13 to a predetermined potential, and a non-contact charger may be used in addition to contact-type roller or brush chargers.

The laser exposure unit 11 is a laser scanning unit (LSU) provided with a laser diode and a reflecting mirror. The laser exposure unit 11 exposes the surfaces of the charged photosensitive drums 13 in accordance with the image data, thus forming electrostatic latent images corresponding to the image data on those surfaces.

The developing units 12 develop the electrostatic latent images formed on the surfaces of the photosensitive drums 13 using toner of the respective colors, thus forming toner images on the surfaces of the photosensitive drums 13. The cleaning units 14 remove and collect toner that remains on the surfaces of the photosensitive drums 13 following the developing and image transfer.

The intermediate transfer belt unit 16 is disposed above the photosensitive drums 13, and includes: an intermediate transfer belt 21; an intermediate transfer belt driving roller 22; a slave roller 23; four intermediate transfer rollers 24; and an intermediate transfer belt cleaning unit 25.

The intermediate transfer belt 21 is configured by forming a film approximately 100 μm to 150 μm in thickness into an endless belt. The intermediate transfer belt driving roller 22, the slave roller 23, the intermediate transfer rollers 24, and so on tension and support the intermediate transfer belt 21, and cause the intermediate transfer belt 21 to cycle in the direction of the arrow C.

The intermediate transfer rollers 24 are supported in a rotatable state near the intermediate transfer belt 21, and are pressed against the corresponding photosensitive drums 13 with the intermediate transfer belt 21 therebetween.

The toner images on the surfaces of the photosensitive drums 13 are sequentially transferred to and superimposed on each other on the intermediate transfer belt 21, thus forming a color toner image (toner images of the respective colors) on the intermediate transfer belt 21. The transfer of the toner images from the photosensitive drums 13 to the intermediate transfer belt 21 is carried out by the intermediate transfer rollers 24 pressurized against the rear surface of the intermediate transfer belt 21. A high-voltage transfer bias (a high voltage having the opposite polarity (+) as the charge polarity (−) of the toner) is applied to the intermediate transfer rollers 24 in order to transfer the toner images.

In this manner, the toner images on the surfaces of the photosensitive drums 13 are layered upon the intermediate transfer belt 21, thus forming a color toner image corresponding to the image data. This color toner image is transported along the intermediate transfer belt 21, and is transferred to recording paper at a nip region between the intermediate transfer belt 21 and a transfer roller 26a of a secondary transfer unit 26. A voltage (a high voltage having the opposite polarity (+) as the charge polarity (−) of the toner) for transferring the toner images of the respective colors from the intermediate transfer belt 21 to the recording paper is applied to the transfer roller 26a of the secondary transfer unit 26.

Meanwhile, there are cases where the toner image on the intermediate transfer belt 21 is not completely transferred to the recording paper by the secondary transfer unit 26, resulting in toner remaining on the intermediate transfer belt 21; this residual toner can cause the intermixing of toner colors in the next transfer process. For this reason, the residual toner is removed and collected by the intermediate transfer belt cleaning unit 25.

After the color toner image has been transferred onto the recording paper at the nip region between the intermediate transfer belt 21 and the transfer roller 26a of the secondary transfer unit 26, the recording paper is transported to the fixing unit 17. The fixing unit 17 includes a heating roller 31, a pressure roller 32, and so on, and grips and transports the recording paper between the heating roller 31 and the pressure roller 32.

The heating roller 31 is controlled to a predetermined fixing temperature based on the output of a temperature detector (not shown), and by heating and compressing the recording paper along with the pressure roller 32, melts, mixes, and compresses the color toner image transferred onto the recording paper, thus thermally fixing the toner image on the recording paper.

Meanwhile, the paper supply tray 18 is a tray for holding the recording paper; the paper supply tray 18 is provided in a lower portion of the image forming apparatus 1, and supplies the recording paper held within the tray. On the other hand, a manual supply tray 7 is a tray for holding recording paper; the manual supply tray 7 is provided in a side wall of the image forming apparatus 1, and supplies the recording paper held within the tray.

An S-shaped paper transport path S for transporting the recording paper supplied from the paper supply tray 18 or the manual supply tray 7 to the paper discharge tray 19 via the secondary transfer unit 26, the fixing unit 17, and so on is provided in the image forming apparatus 1. Paper resist rollers 34, the fixing unit 17, transport rollers 35, discharge rollers 36, and so on are disposed along this paper transport path S.

A paper pickup roller 33 is provided at an end of the paper supply tray 18; the recording paper is pulled out from the paper supply tray 18, one sheet at a time, by the paper pickup roller 33, and is transported to the paper transport path S. Meanwhile, a pickup roller 8 is provided at an end of the manual supply tray 7; the recording paper is pulled out from the manual supply tray 7, one sheet at a time, by the pickup roller 8, and is transported to the paper transport path S.

The transport rollers 35 are small-sized rollers for assisting the transport of the recording paper, and a plurality are provided as pairs.

The paper resist rollers 34 temporarily stop the recording paper that has been transported thereto, and align the leading edge of the recording paper. In addition, the paper resist rollers 34 transport the recording paper at an appropriate timing in correspondence with the rotation of the photosensitive drums 13 and the intermediate transfer belt 21, so that the color toner image upon the intermediate transfer belt 21 is transferred onto the recording paper at the nip region between the intermediate transfer belt 21 and the transfer roller 26a of the secondary transfer unit 26.

For example, the paper resist rollers 34 transport the recording paper based on the output of a pre-resist detection switch (not shown) so that, at the nip region between the intermediate transfer belt 21 and the transfer roller 26a of the secondary transfer unit 26, the leading edge of the color toner image on the intermediate transfer belt 21 matches the leading edge of the region of the recording paper on which the image is to be formed.

Furthermore, after the color toner image has been fixed onto the recording paper by the fixing unit 17 and the recording paper has passed through the fixing unit 17, the recording paper is discharged facedown onto the paper discharge tray 19 by the discharge rollers 36.

Meanwhile, in the case where printing is to be carried out on the rear surface of the recording paper as well as the front surface of the recording paper, the discharge rollers 36 in the paper transport path S are stopped and then rotated in the reverse direction while the recording paper is being transported by the discharge rollers 36, after which the recording paper passes through an inversion path Sr; this inverts the front and rear surfaces of the recording paper, after which the recording paper is conducted to the paper resist rollers 34 and, as with the front surface of the recording paper, an image is recorded and fixed onto the rear surface of the recording paper and the recording paper is discharged to the paper discharge tray 19.

Next, the document reading apparatus 2 provided in an upper portion of the image forming apparatus 1 will be described.

This document reading apparatus 2 includes a lower first reading unit 41 and an upper paper transport device 42. The far edge of the paper transport device 42 is supported in a pivotable manner on the far edge of the first reading unit 41 via a hinge (not shown). The paper transport device 42 can be opened and closed by raising or lowering the portion thereof on the near side. Opening the paper transport device 42 exposes a platen glass 44 of the first reading unit 41, and a document can be placed upon the platen glass 44.

The first reading unit 41 includes: the platen glass 44; a first scanning unit 45; a second scanning unit 46; an image forming lens 47; a charge coupled device (CCD) 48; and so on. The first scanning unit 45 includes a light source 51 and a first reflection mirror 52, and irradiates the surface of the document on the platen glass 44 using the light source 51 while moving, in a sub scanning direction, a distance based on the size of the document at a constant velocity V; the light reflected therefrom is reflected by the first reflecting mirror 52 and conducted to the second scanning unit 46, and an image of the surface of the document is scanned in the sub scanning direction as a result. The second scanning unit 46 includes second and third reflecting mirrors 53 and 54, and the light reflected by the document is reflected by the second and third reflecting mirrors 53 and 54 and conducted to the image forming lens 47 while the second scanning unit 46 moves along with the first scanning unit 45 at a velocity V/2. The image forming lens 47 collects the light reflected by the document onto the CCD 48 and forms an image of the surface of the document on the CCD 48. The CCD 48 repeatedly scans the image of the surface of the document in a main scanning direction and then outputs an analog image signal corresponding to one main scanning line after each scan.

Pulleys (not shown) are provided in the first and second scanning units 45 and 46, respectively, and wires (not shown) are stretched upon these pulleys; the wires are driven by stepping motors, and the first and second scanning units 45 and 46 move in synchronization.

Meanwhile, the first reading unit 41 is capable of reading images not only of still documents, but also of the surfaces of documents that are being transported by the paper transport device 42. In this case, as shown in FIG. 1, the first scanning unit 45 is moved to a reading position below a document reading glass 55, the position of the second scanning unit 46 is determined in accordance with the position of the first scanning unit 45, and the paper transport device 42 begins to transport the document in this state.

In the paper transport device 42, a pickup roller 56 is pressed against a document on a document tray 57 and rotated; the document is pulled out and transported via a paper transport path 58, passes between the document reading glass 55 of the first reading unit 41 and a reading guide plate 59, passes below a glass plate 67 in a second reading unit 43, and is discharged to a discharge tray 62 from a discharge roller pair 61.

When the document is transported, the surface of the document is irradiated by the light source 51 of the first scanning unit 45 through the document reading glass 55, and the light reflected by the document is conducted to the image forming lens 47 by the reflection mirrors in the first and second scanning units 45 and 46, respectively; the light reflected by the document is collected on the CCD 48 by the image forming lens 47, an image of the surface of the document is formed upon the CCD 48, and an image of the surface of the document is read as a result.

At the same time as an image of the front surface of the document transported by the paper transport device 42 is read, an image of the rear surface of the document can be read by the second reading unit 43 within the paper transport device 42. The second reading unit 43 is disposed above the platen glass 44, and includes a contact image sensor (abbreviated as "CIS" hereinafter) 66 and the glass plate 67 that guides the document. A document that has passed above the document reading glass 55 of the first reading unit 41 passes below the glass plate 67 of the second reading unit 43 and is discharged to the discharge tray 62. The CIS 66 irradiates the rear surface of the document when the document passes below the glass plate 67, receives the light reflected by the document, and reads an image of the rear surface of the document.

The images of the document read by the CCD 48 and the CIS 66 in this manner are outputted from the CCD 48 and the CIS 66 as analog image signals, and the analog image signals are converted into digital image signals through A/D conversion. The digital image signals (image data) are transmitted to the laser exposure unit 11 of the image forming apparatus 1 after undergoing various image processes, and the images are recorded onto recording paper in the image forming apparatus 1; the recording paper is then outputted as a copied document.

Next, the paper transport device 42 embodying the present invention will be described.

Figure 2:
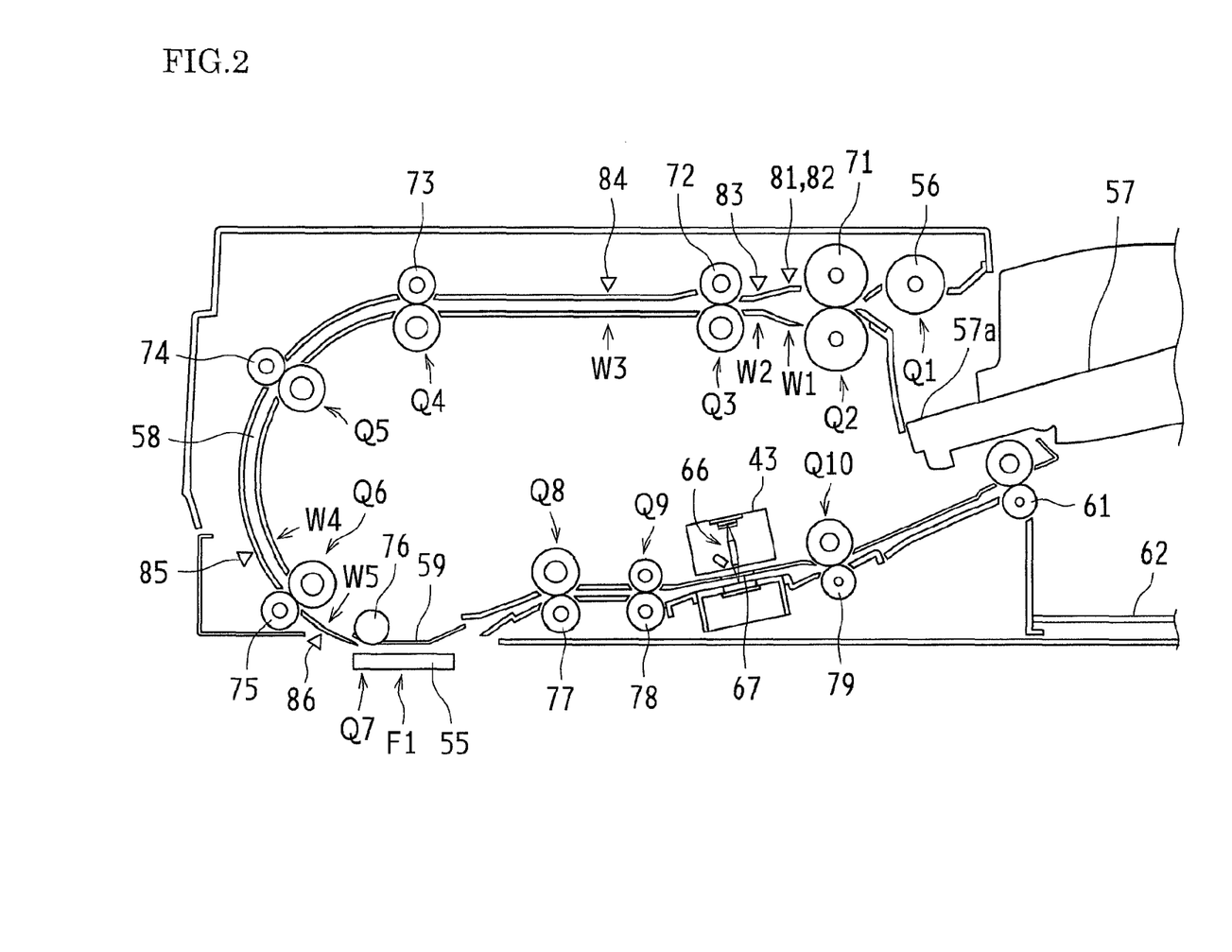
FIG. 2 is a schematic diagram illustrating a paper transport device according to an embodiment.

The paper transport device 42 according to the present embodiment supports the document tray 57 so that a left side portion 57a of the document tray 57 can be raised/lowered. The paper transport device 42 lowers the left side portion 57a when in a standby state. When a document is placed on the document tray 57, the left side portion 57a is raised, the pickup roller 56 is pressed against the document on the document tray 57, the pickup roller 56 is rotated and the document is pulled out from the document tray 57 by the pickup roller 56, and the document is sent to the paper transport path 58. The paper transport path 58 is curved in a C shape whose starting end is located near the pickup roller 56 and that passes through a reading position F1 between the document reading glass 55 and the reading guide plate 59, ending near the discharge roller pair 61.

In the paper transport path 58, a paper supply roller pair 71, a first resist roller pair 72, a first transport roller pair 73, a second transport roller pair 74, a second resist roller pair 75, and a reading transport roller 76 are disposed in the area between the pickup roller 56 and the reading position F1. In addition, a third transport roller pair 77, a fourth transport roller pair 78, and a fifth transport roller pair 79 are disposed in the area between the reading position F1 and the discharge roller pair 61.

Figure 3:
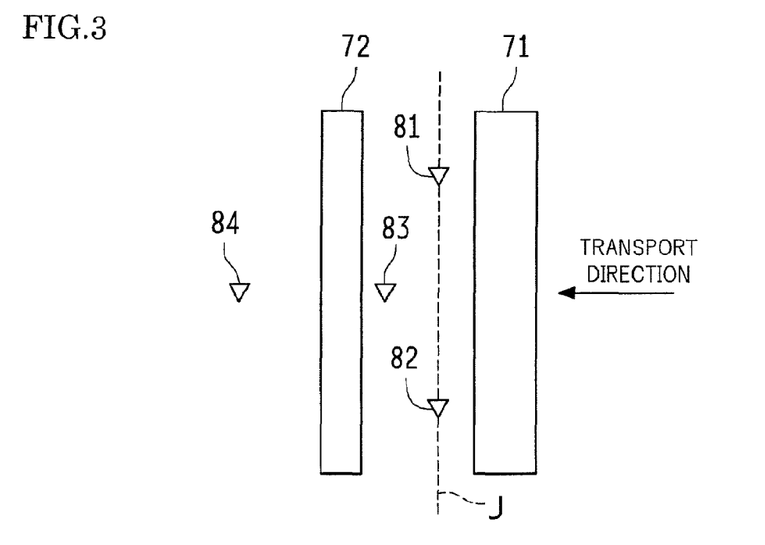
FIG. 3 is a plan view illustrating the vicinity of a first resist roller in the paper transport device shown in FIG. 2.

Furthermore, in the paper transport path 58, first and second paper sensors 81 and 82 are disposed upstream from the first resist roller pair 72 in the document transport direction. The first and second paper sensors 81 and 82 detect whether or not the document is angled relative to the transport direction of the document, or in other words, detect angled travel. As shown in FIG. 3, the first and second paper sensors 81 and 82 are arranged along an imaginary line J that is orthogonal to the transport direction of the document, and detect at respective timings the leading edge of the document, which extends longer in the direction orthogonal to the transport direction of the document. The greater the angle of the document relative to the transport direction of the document, the greater the angle of the leading edge of the document relative to the imaginary line J will become, and thus a difference between the timings at which the first and second paper sensors 81 and 82 detect the leading edge of the document will increase; whether or not the document is traveling at an angle can be detected based on this difference in the detection timings.

Furthermore, first and second paper passage sensors 83 and 84 are disposed upstream and downstream, respectively, from the first resist roller pair 72 in the transport direction of the document, and third and fourth paper passage sensors 85 and 86 are disposed upstream and downstream, respectively, from the second resist roller pair 75 in the transport direction of the document. A plurality of other paper passage sensors are also disposed, but those sensors will be omitted here. These paper passage sensors detect the timings at which the leading edge and the following edge of the document pass.

The first and second paper sensors 81 and 82, the first through fourth paper passage sensors 83 through 86, and the other paper passage sensors (not shown) are optical sensors; for example, the sensors emit light from a light-emitting element into the transport path of the document, receive the light reflected from the transported document using a light-receiving element, and change the output of the light-receiving element in accordance with the passage of the leading edge and following edge of the document.

Note that in FIG. 2, the position of the pickup roller 56 is indicated by Q1, the position of the paper supply roller pair 71 is indicated by Q2, the position of the first resist roller pair 72 is indicated by Q3, the position of the first transport roller pair 73 is indicated by Q4, the position of the second transport roller pair 74 is indicated by Q5, the position of the second resist roller pair 75 is indicated by Q6, the position of the reading transport roller 76 is indicated by Q7, the position of the third transport roller pair 77 is indicated by Q8, the position of the fourth transport roller pair 78 is indicated by Q9, and the position of the fifth transport roller pair 79 is indicated by Q10. In addition, the position of the first and second paper sensors 81 and 82 is indicated by W1, the position of the first paper passage sensor 83 is indicated by W2, the position of the second paper passage sensor 84 is indicated by W3, the position of the third paper passage sensor 85 is indicated by W4, and the position of the fourth paper passage sensor 86 is indicated by W5.

Figure 4:
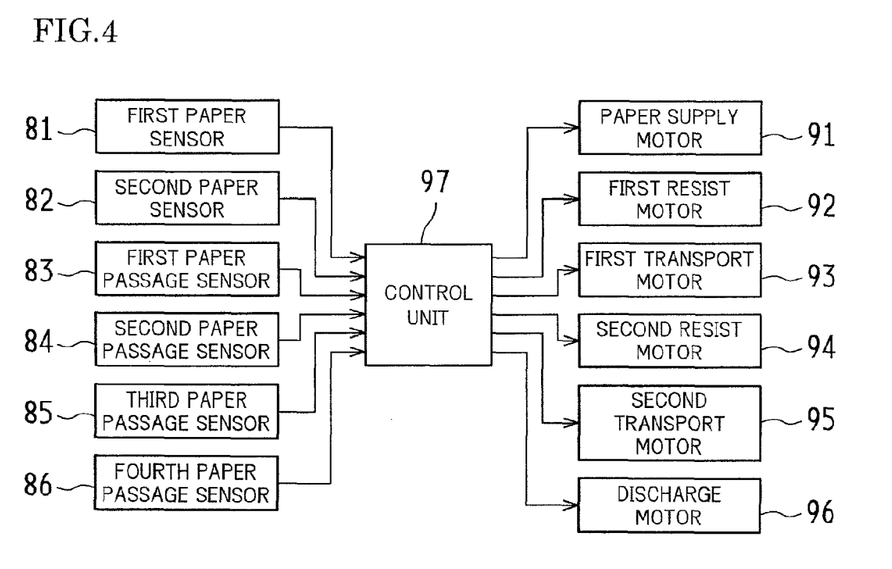
FIG. 4 is a block diagram illustrating the configuration of a control system in the paper transport device shown in FIG. 2.

As shown in FIG. 4, a paper supply motor 91 transmits its rotational driving force to the pickup roller 56 and the paper supply roller pair 71 through a gear unit or the like, thus rotationally driving those rollers. A first resist motor 92 transmits its rotational driving force to the first resist roller pair 72 through a gear unit or the like, thus rotationally driving those rollers. A first transport motor 93 transmits its rotational driving force to the first and second transport roller pairs 73 and 74 through a gear unit or the like, thus rotationally driving those rollers. A second resist motor 94 transmits its rotational driving force to the second resist roller pair 75 through a gear unit or the like, thus rotationally driving those rollers. A second transport motor 95 transmits its rotational driving force to the reading transport roller 76 and the third through fifth transport roller pairs 77 through 79 through a gear unit or the like, thus rotationally driving those rollers. A discharge motor 96 transmits its rotational driving force to the discharge roller pair 61 through a gear unit or the like, thus rotationally driving those rollers.

A control unit 97 detects whether or not the document is traveling at an angle based on the difference between the timings at which the leading edge of the document is detected by the first and second paper sensors 81 and 82. The driving of the respective motors 91 through 96 is controlled based on the result of the detection as to whether or not the document is traveling at an angle and the timings at which the leading edge and following edge of the document pass as detected by the first through fourth paper passage sensors 83 through 86. The angled travel of the document is corrected by controlling the rotational speeds of the respective rollers, after which the document is transported through the paper transport path 58.

Next, the correction of the angled travel of the document, the transport of the document, and so on in the paper transport device 42 will be described.

First, in the paper transport device 42, when the document is fed out to the paper transport path 58 by the pickup roller 56, the document is transported from the paper supply roller pair 71 to the first resist roller pair 72. Then, the first and second paper sensors 81 and 82 that are upstream from the first resist roller pair 72 in the transport direction of the document detect whether or not the document is traveling at an angle.

Here, if the document is traveling at an angle, the document is transported from the paper supply roller pair 71 to the first resist roller pair 72, whereupon the leading edge of the document butts against the first resist roller pair 72 that is in a stopped state; the document is pushed further by a set length, which causes the document to flex. Due to the repulsive force of the flexed document, the leading edge of the document is aligned so as to be parallel with the first resist roller pair 72, which corrects the angled travel of the document; after this, the document is transported to the first transport roller pair 73 by the paper supply roller pair 71 and the first resist roller pair 72.

Furthermore, the document is transported from the first and second transport roller pairs 73 and 74 to the second resist roller pair 75, whereupon the leading edge of the document butts against the second resist roller pair 75 that is in a stopped state; the document is pushed further by a set length, which causes the document to flex. Due to the repulsive force of the document at this time, the leading edge of the document is aligned so as to be parallel with the second resist roller pair 75, which corrects the angled travel of the document; the document is then transported to the reading transport roller 76 by the first and second transport roller pairs 73 and 74 and the second resist roller pair 75.

Meanwhile, the second resist roller pair 75 transports the document at an appropriate timing so that the leading edge of the document arrives at the reading position of the CCD 48 in the first reading unit 41 when the reading of the document by the CCD 48 starts.

The reading transport roller 76 and the third through fifth transport roller pairs 77 through 79 rotate at a constant rotational speed, and transport the document from the second resist roller pair 75 to the discharge roller pair 61 via the reading position F1. The discharge roller pair 61 discharges the document to the discharge tray 62.

Accordingly, in the case where angled travel of the document is detected upstream from the first resist roller pair 72 in the transport direction of the document, the angled travel of the document is corrected by both the first and second resist roller pairs 72 and 75. For this reason, angled travel of the document can be corrected favorably even if the transport speed of the document has been increased. Furthermore, the timing at which the document is transported to the reading position F1 can be adjusted by the second resist roller pair 75.

Figure 5:
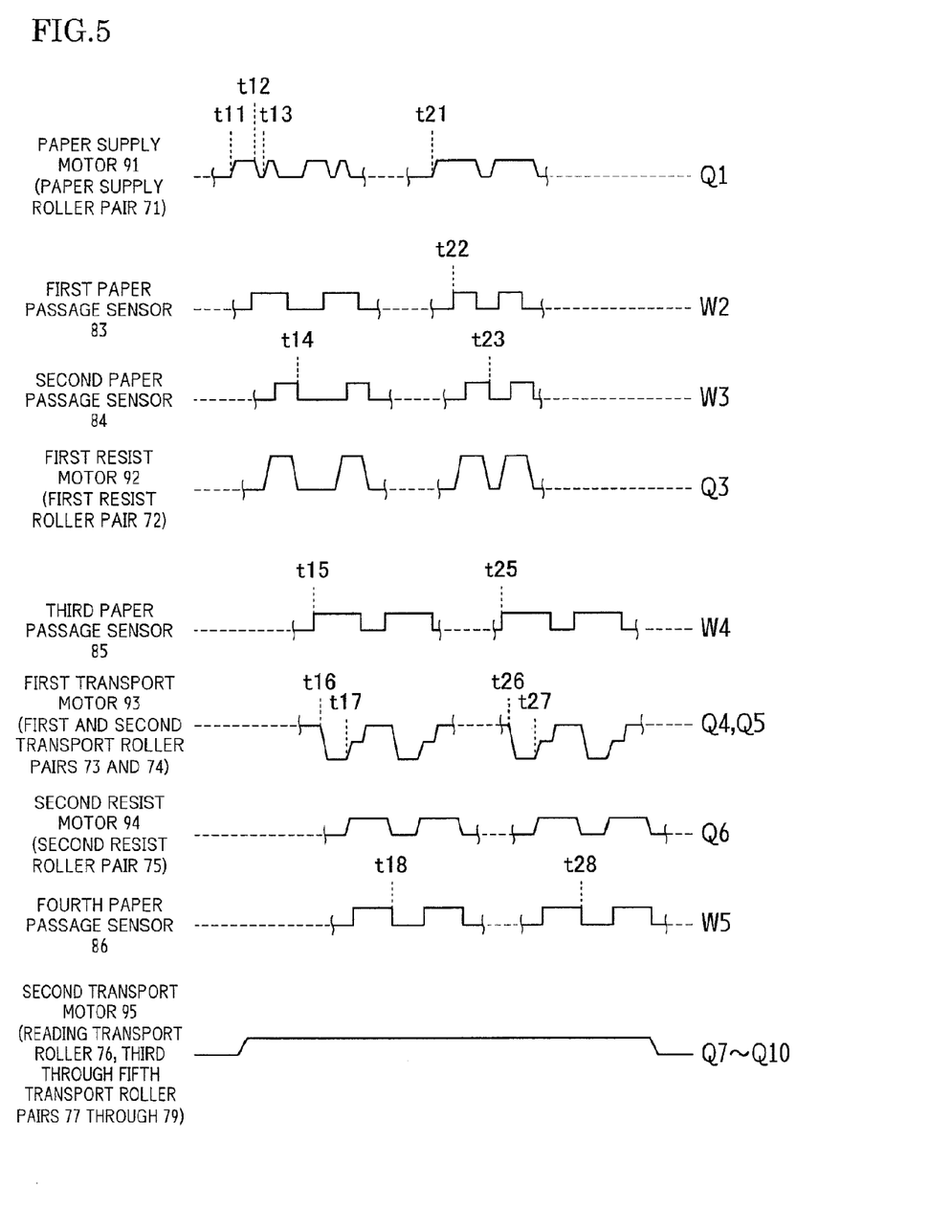
FIG. 5 is a timing chart illustrating operational timings of motors that rotationally drive corresponding rollers and detection timings of corresponding sensors in the paper transport device shown in FIG. 2.

Continuing on, the operational timings of the respective rollers and the detection timings of the respective sensors in the case where the document is traveling at an angle will be described with reference to the timing chart shown in FIG. 5. FIG. 5 is a timing chart illustrating the operational timings of the respective motors 91 through 95 that drive the corresponding rollers, and the detection timings of the respective sensors 83 through 86, in the paper transport device 42.

In FIG. 5, when the paper supply motor 91 begins rotating at time t11, the document is pulled out by the pickup roller 56, after which the document is transported from the paper supply roller pair 71 to the first resist roller pair 72.

When angled travel of the document is detected by the first and second paper sensors 81 and 82 and the leading edge of the document is then detected by the first paper passage sensor 83, the rotation of the paper supply motor 91 (the paper supply roller pair 71) is continued and then stopped after a set amount of time has passed following the timing at which the leading edge of the document was detected, in a state in which the rotation of the first resist motor 92 (the first resist roller pair 72) is stopped; the leading edge of the document butts against the first resist roller pair 72 at time t12, which falls immediately before the paper supply roller pair 71 is stopped. The document is then pushed further by a set length, which aligns the leading edge of the document so as to be parallel with the first resist roller pair 72, thus correcting the angled travel of the document.

After this, the rotation of the paper supply motor 91 and the first resist motor 92 is started from time t13, which resumes the transport of the document by the paper supply roller pair 71 and the first resist roller pair 72; the paper supply motor 91 (paper supply roller pair 71) is stopped after a set amount of time has passed following the detection of the leading edge of the document by the first paper passage sensor 83, whereas the rotation of the first resist motor 92 (first resist roller pair 72) is continued until time t14, when the following edge of the document is detected by the second paper passage sensor 84, thus transporting the document to the first transport roller pair 73.

The document is further transported to the second resist roller pair 75 from the first and second transport roller pairs 73 and 74, and the leading edge of the document is detected by the third paper passage sensor 85 at time t15; the rotation of the first transport motor 93 (the first and second transport roller pairs 73 and 74) is continued and then stopped after a set amount of time has passed following the timing of that detection, in a state in which the rotation of the second resist motor 94 (the second resist roller pair 75) is stopped. At time t16, which is immediately before the first and second transport roller pairs 73 and 74 are stopped, the leading edge of the document butts against the second resist roller pair 75; the document is then pushed further by a set length, which aligns the leading edge of the document so as to be parallel with the second resist roller pair 75, thus correcting the angled travel of the document once again. The rotation of the first transport motor 93 and the second resist motor 94 is started from time t17, and the first and second transport roller pairs 73 and 74 and the second resist roller pair 75 resume the transport of the document. The rotation of the second resist motor 94 (the second resist roller pair 75) is continued and the document is transported to the reading transport roller 76 until time t18, when the following edge of the document is detected by the fourth paper passage sensor 86.

Figure 6:
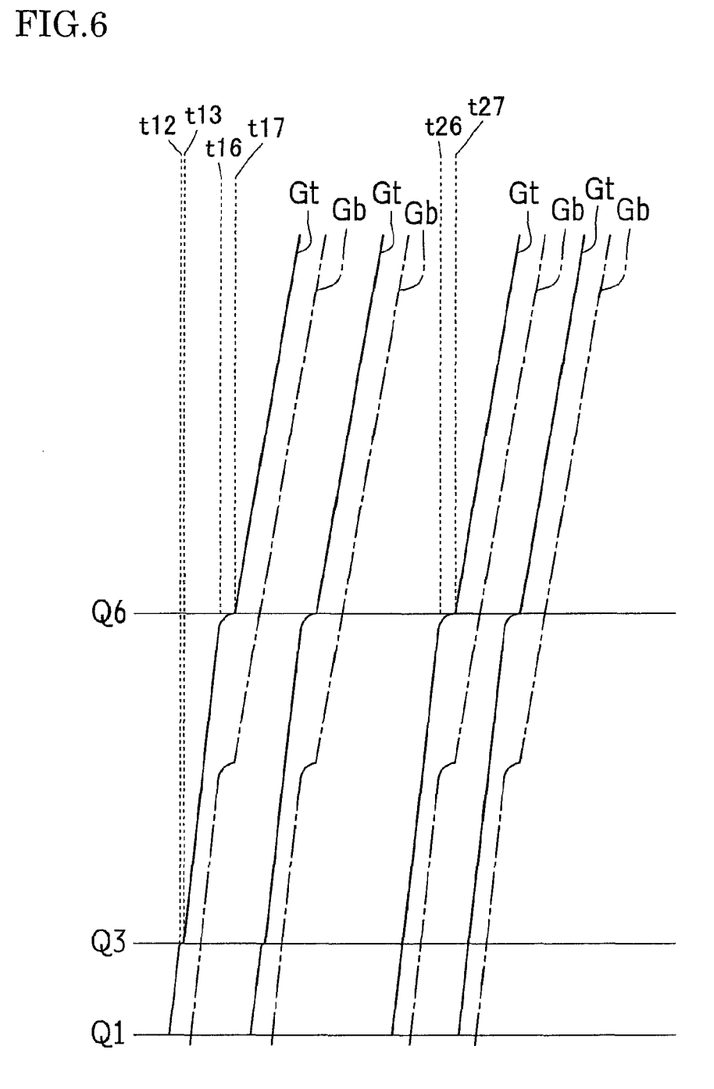
FIG. 6 is a diagram illustrating the progress of transport of the leading edge and the following edge of a document in the paper transport device shown in FIG. 2.

FIG. 6 is a diagram illustrating the progress of transport of a leading edge Gt and a following edge Gb of a document in the paper transport device 42. Note that the times t12, t13, t16, and t17, which correspond to the same times in FIG. 5, are shown in FIG. 6. Furthermore, the position Q1 of the paper supply roller pair 71, the position Q3 of the first resist roller pair 72, and the position Q6 of the second resist roller pair 75 are indicated in FIG. 6.

As shown in FIG. 6, the leading edge Gt of the document is stopped at the position Q3 of the first resist roller pair 72 from time t12, when the leading edge Gt of the document butts against the first resist roller pair 72, to time t13, when the transport of the document is resumed by the paper supply roller pair 71 and the first resist roller pair 72.

In addition, the leading edge Gt of the document stops at the position Q6 of the second resist roller pair 75 and the following edge Gb of the document also stops as a result, from time t16, when the leading edge Gt of the document butts against the second resist roller pair 75, to time t17, when the transport of the document is resumed by the first and second transport roller pairs 73 and 74 and the second resist roller pair 75.

Accordingly, in the case where angled travel of the document is detected upstream from the first resist roller pair 72 in the transport direction of the document, the leading edge of the document is stopped by both the first and second resist roller pairs 72 and 75, thus correcting the angled travel of the document.

On the other hand, in the case where the document was not traveling at an angle, the document is transported through the following procedure.

In the case where angled travel of the document has not been detected by the first and second paper sensors 81 and 82 located upstream from the first resist roller pair 72 in the transport direction of the document, the first resist roller pair 72 is controlled to a rotational state when the document is transported from the paper supply roller pair 71 to the first resist roller pair 72. For this reason, the leading edge of the document does not butt against and stop at the first resist roller pair 72, and is instead transported directly from the first resist roller pair 72 to the first transport roller pair 73.

Thereafter, the document is transported from the first and second transport roller pairs 73 and 74 to the second resist roller pair 75, in the same manner as when the document was traveling at an angle. The leading edge of the document butts against the second resist roller pair 75 that is stopped, and the document is pushed further by a set length. As a result, the document flexes, and the leading edge of the document is aligned so as to be parallel with the second resist roller pair 75 due to the repulsive force of the flexed document, thus correcting the angled travel of the document. Continuing on, the document is transported to the reading transport roller 76 by the first and second transport roller pairs 73 and 74 and the second resist roller pair 75.

Meanwhile, the second resist roller pair 75 transports the document at an appropriate timing so that the leading edge of the document arrives at the reading position of the CCD 48 in the first reading unit 41 when the reading of the document by the CCD 48 starts.

Furthermore, the document is transported by the reading transport roller 76, passes the reading position F1, is transported by the third through fifth transport roller pairs 77 through 79, and reaches the discharge roller pair 61; the document is then discharged to the discharge tray 62 by the discharge roller pair 61.

Next, the operational timings of the respective motors 91 through 95 and the detection timings of the respective sensors 83 through 86 in the case where the document is not traveling at an angle will be described with reference to the timing chart shown in FIG. 5.

In FIG. 5, when the paper supply motor 91 begins rotating at time t21, the document is pulled out by the pickup roller 56, after which the document is transported from the paper supply roller pair 71 to the first resist roller pair 72.

At this time, angled travel of the document is not detected by the first and second paper sensors 81 and 82, and thus when the leading edge of the document is detected by the first paper passage sensor 83, the rotation of the first resist motor 92 starts from time t22, when the stated detection occurs. Meanwhile, the document continues to be transported by the paper supply roller pair 71 and the first resist roller pair 72. Furthermore, the paper supply motor 91 (the paper supply roller pair 71) is stopped after a set amount of time has passed following the detection of the leading edge of the document by the first paper passage sensor 83, and the rotation of the first resist motor 92 (the first resist roller pair 72) is continued until time t23, when the following edge of the document is detected by the second paper passage sensor 84. Through this, the document can be quickly transported from the first resist roller pair 72 to the first transport roller pair 73.

Furthermore, the document is transported from the first and second transport roller pairs 73 and 74 to the second resist roller pair 75. At time t25, the leading edge of the document is detected by the third paper passage sensor 85, and the rotation of the first transport motor 93 (the first and second transport roller pairs 73 and 74) is continued after a set amount of time has passed following that detection, in a state in which the rotation of the second resist motor 94 (the second resist roller pair 75) is stopped.

At time t26, which is immediately before the first and second transport roller pairs 73 and 74 are stopped, the leading edge of the document butts against the second resist roller pair 75; the document is then pushed further by a set length, which aligns the leading edge of the document so as to be parallel with the second resist roller pair 75, thus correcting the angled travel of the document. Next, the rotation of the first transport motor 93 and the second resist motor 94 is started from time t27, and the first and second transport roller pairs 73 and 74 and the second resist roller pair 75 resume the transport of the document. At time t28, when the following edge of the document is detected by the fourth paper passage sensor 86, the rotation of the first transport motor 93 and the second resist motor 94 (the first and second transport roller pairs 73 and 74 and the second resist roller pair 75) is continued, and the document is transported to the reading transport roller 76.

Next, the transport progress of the leading edge and following edge of the document when the document is not traveling at an angle will be described with reference to FIG. 6. Note that the times t26 and t27, which correspond to the same times in FIG. 5, are shown in FIG. 6.

As described earlier, the first resist roller pair 72 continues to rotate from time t22, when the leading edge of the document is detected by the first paper passage sensor 83, to time t23, when the following edge of the document is detected by the second paper passage sensor 84, and the document is transported to the first transport roller pair 73. For this reason, the leading edge Gt of the document does not stop at the position Q3 of the first resist roller pair 72, as shown in FIG. 6.

Meanwhile, in the same manner as when the document is traveling at an angle, the leading edge Gt of the document stops, and the following edge Gb of the document also stops in correspondence thereto, from time t26, when the leading edge Gt of the document has butted against the second resist roller pair 75, to time t27, when the first and second transport roller pairs 73 and 74 and the second resist roller pair 75 begin to transport the document.

Here, FIG. 6 compares the transport progress of the leading edge Gt and following edge Gb of the document when the document is traveling at an angle with the transport progress of the leading edge Gt and following edge Gb of the document when the document is not traveling at an angle. As can be seen from FIG. 6, when the document is not traveling at an angle, the document is transported without stopping at the position Q3 of the first resist roller pair 72, and thus there is no drop in the transport speed.

Therefore, the transport period when the document is not traveling at an angle is shorter than the transport period when the document is traveling at an angle. For this reason, in the case where, for example, multiple documents are sequentially pulled out by the pickup roller 56 and a constant transport interval is maintained between the documents, the number of documents that can be read by the document reading apparatus 2 in a single unit of time can be increased as long as the documents do not travel at an angle, and thus the speed of the reading processing can be increased.

In this manner, according to the paper transport device 42 of the present embodiment, angled travel of a document is not corrected by the first resist roller pair 72 when angled travel has not been detected in the document upstream from the first resist roller pair 72 in the transport direction of the document, and the angled travel of the document is corrected only by the second resist roller pair 75. For this reason, the leading edge of the document does not butt against and stop at the first resist roller pair 72, and thus the transport speed of the document does not drop at the first resist roller pair 72. Accordingly, the original function of the resist roller pairs can be fulfilled only by the second resist roller pair 75, and a drop in the transport speed of the document can be suppressed to approximately the same degree as when only a single resist roller is provided; this makes it easy to increase the transport speed of the document, which in turn makes it possible to increase the speed of the reading processing on the document. Furthermore, the timing at which the document is transported can be adjusted by the second resist roller pair 75.

Figure 7:
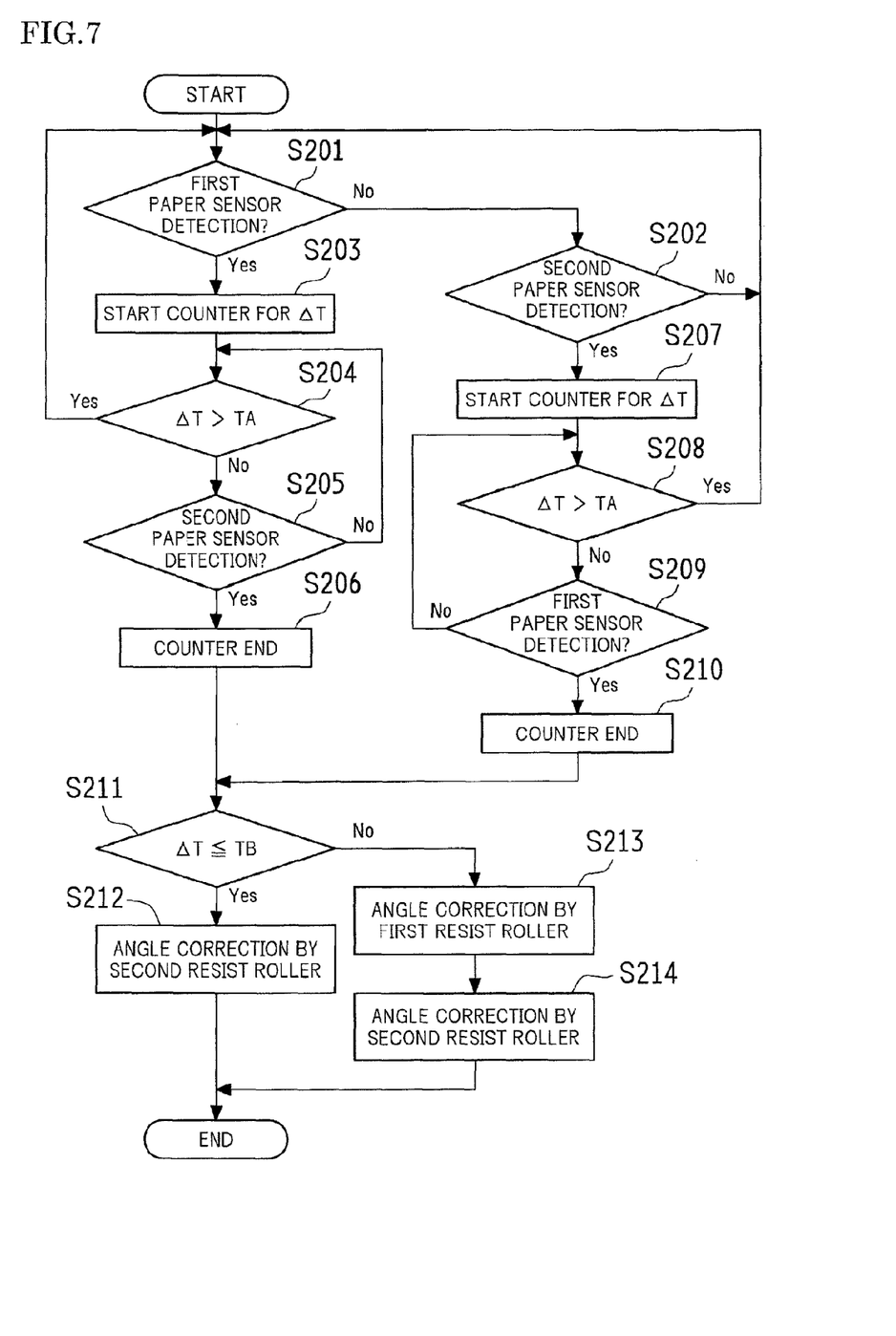
FIG. 7 is a flowchart illustrating a procedure for detecting whether or not a document is traveling at an angle in the paper transport device shown in FIG. 2.

Next, a procedure for detecting whether or not the document is traveling at an angle based on the detection timing of the first and second paper sensors 81 and 82 upstream from the first resist roller pair 72 in the transport direction of the document will be described. FIG. 7 is a flowchart illustrating a procedure for detecting whether or not a document is traveling at an angle.

The control unit 97 shown in FIG. 4 monitors the detection output from the first and second paper sensors 81 and 82 (steps S201, S202). If the leading edge of the document is detected by neither of the first and second paper sensors 81 and 82 ("No" in steps S201, S202), steps S201 and S202 are repeated.

When, in this state, a document is fed to the paper transport path 58 by the pickup roller 56, the leading edge of the document is detected by the first and second paper sensors 81 and 82. For example, when the leading edge of the document is detected by the first paper sensor 81 ("Yes" in step S201), the control unit 97 starts an internal timer and begins measuring a time difference $\Delta T$ between the detection timings of the first and second paper sensors 81 and 82 (step S203). When it is confirmed that the time difference $\Delta T$ does not exceed a specified time TA ("No" in step S204), it is determined whether or not the leading edge of the document has been detected by the second paper sensor 82 (step S205). If the leading edge of the document has not been detected by the second paper sensor 82 ("No" in step S205), steps S204 and S205 are repeated.

At this time, if the leading edge of the document is detected by the second paper sensor 82 ("Yes" in step S205) with the time difference ΔT not exceeding the specified time TA ("No" in step S204), the control unit 97 stops the internal timer (step S206) and obtains the time difference ΔT between the detection timings of the first and second paper sensors 81 and 82.

Meanwhile, the internal timer is also started in the case where the leading edge of the document has been detected by the second paper sensor 82 ("Yes" in step S202), and the measurement of the time difference ΔT between the detection timings of the first and second paper sensors 81 and 82 is started (step S207). It is then repeatedly determined whether or not the time difference ΔT has exceeded the specified time TA (step S208) and whether or not the leading edge of the document has been detected by the first paper sensor 81 (step S209). If the leading edge of the document is detected by the first paper sensor 81 ("Yes" in step S209) with the time difference ΔT not exceeding the specified time TA ("No" in step S208), the internal timer is stopped (step S210) and the time difference ΔT between the detection timings of the first and second paper sensors 81 and 82 is obtained.

Here, as shown in FIG. 3, the first and second paper sensors 81 and 82 are arranged upon the imaginary line J that is orthogonal to the transport direction of the document, and thus if the document is not traveling at an angle, the leading edge of the document will be approximately parallel to that imaginary line; as a result, the detection timings of the first and second paper sensors 81 and 82 that detect the leading edge of the document will either match or the difference will decrease. In other words, the time difference ΔT will either be 0 or will decrease. On the other hand, when the document is traveling at an angle, the difference between the detection timings of the first and second paper sensors 81 and 82 will increase the greater the angle of the leading edge of the document becomes, and the time difference ΔT will increase as a result.

Accordingly, the control unit 97 determines whether or not the time difference ΔT is equal to or less than a pre-set permissible time TB (where TB<TA) (step S211). If the time difference ΔT is equal to or less than the permissible time TB ("Yes" in step S211), it is determined that the document is not traveling at an angle. In this case, the control unit 97 controls the rotation of the respective rollers at the timings indicated by the times t21 through t28 in FIG. 5. Accordingly, the original function of the resist roller pairs is fulfilled only by the second resist roller pair 75 (step S212), and a drop in the transport speed of the document caused by the first resist roller pair 72 is avoided. Furthermore, the timing at which the document is transported is adjusted by the second resist roller pair 75.

On the other hand, if the time difference ΔT is greater than the permissible time TB ("No" in step S211), the control unit 97 determines that the document is traveling at an angle. In this case, the control unit 97 controls the rotation of the respective rollers at the timings indicated by the times t11 through t18 in FIG. 5. Accordingly, the angled travel of the document is corrected by both the first and second resist roller pairs 72 and 75 (steps S213, S214). For this reason, angled travel of the document can be corrected favorably even if the transport speed of the document has been increased. Furthermore, the timing at which the document is transported can be adjusted by the second resist roller pair 75.

However, if the time difference ΔT exceeds the specified time TA ("Yes" in step S204 or S208), the control unit 97 stops the internal timer, resets the time difference ΔT, and returns to steps S201 and S202.

Here, in the case where the angle of the leading edge of the document has become too high, the difference between the timings at which the first and second paper sensors 81 and 82 detect the leading edge of the document will become extremely high. In addition, the difference between the timings at which the first and second paper sensors 81 and 82 detect the leading edge of the document will become extremely high in the case where a detection error has occurred in the first and second paper sensors 81 and 82. In either case, angled travel in the document cannot be properly corrected based on the detection timings of the first and second paper sensors 81 and 82. For this reason, when the time difference ΔT has exceeded the specified time TA, the time difference ΔT is reset and the detection of the angled travel of the document is invalidated.

Meanwhile, there are cases where a large amount of paper dust produced by the documents builds up in the paper transport path 58 of the paper transport device 42, and if this paper dust sticks to the first and second paper sensors 81 and 82, detection errors will certainly result in the first and second paper sensors 81 and 82. Accordingly, when the time difference ΔT has exceeded the specified time TA ("Yes" in step S204 or S208), a notification indicating that paper dust has been produced in the paper transport path 58 may be displayed in a display screen of the image forming apparatus 1 so as to prompt the cleaning of the paper transport path 58.

Although a preferred embodiment of the present invention has been described with reference to the appended drawings, it goes without saying that the present invention is not limited to the embodiment described above.

For example, although the aforementioned embodiment describes transporting a document that is read by a document reading apparatus, the paper transport device of the present invention may be applied in the paper transport path S of the image forming apparatus 1; the angled travel of recording paper may be corrected by the first and second resist rollers, or the rotational speed of the first resist roller may be controlled so that the recording paper is transported without the leading edge thereof butting against and stopping at the first resist roller in the case where the recording paper is not traveling at an angle, and the original function of the resist roller pairs may be fulfilled only by the second resist roller.

Note that the present invention may be embodied in other various forms without departing from the spirit or essential characteristics thereof. Accordingly, the embodiments disclosed in this application are to be considered in all respects as illustrative and not limiting. The scope of the present invention is indicated by the appended claims rather than by the foregoing description. Furthermore, all changes which come within the meaning and range of equivalency of the claims are intended to be embraced therein.

What is claimed is:

1. A paper transport device that corrects angled travel in paper, comprising:
   a first registration roller and a second registration roller that is disposed on an upstream side and a downstream side in a transport direction of the paper, with a distance between the first registration roller and the second registration roller in the transport path of the paper;
   an angled travel detection unit that is disposed upstream from the first registration roller in the transport direction of the paper and that detects angled travel in the paper; and
   a control unit, wherein the first and second registration rollers correct angled travel in the paper by stopping the paper when the leading edge of the paper butts against the first and second registration rollers and then transporting the paper;

when angled travel is not detected in the paper by the angled travel detection unit, the control unit controls the first and second registration rollers so that: the first registration roller keeps rotating so that the paper is transported and not stopped even when the leading edge of the paper butts against the first registration roller; and the second registration roller temporarily stops and thereafter rotates so that the paper stops when the leading edge of the paper butts against the second registration roller and is then transported, and when angled travel has been detected in the paper by the angle travel detection unit, the control unit controls the first and second registration rollers so that the first and second registration rollers temporarily stop and then rotate so that the paper stops when the leading edge of the paper butts against the first and second registration rollers and is then transported.

2. The paper transport device according to claim 1,
wherein the angled travel detection unit includes a first paper sensor and a second paper sensor, disposed at a distance from each other in a direction orthogonal to the transport direction of the paper, that each detect the leading edge of the paper.

3. The paper transport device according to claim 2,
wherein angled travel is detected in the paper based on a difference between the timing at which the leading edge of the paper is detected by the first paper sensor and the timing at which the leading edge of the paper is detected by the second paper sensor.

4. The paper transport device according to claim 2,
wherein the detection of angled travel in the paper is invalidated when a difference between the timings at which the leading edge of the paper is detected by the first and second paper sensors is greater than a specified value.

5. A document reading apparatus comprising the paper transport device according to claim 1.

6. An image forming apparatus comprising the paper transport device according to claim 1.

7. A document reading apparatus comprising the paper transport device according to claim 2.

8. A document reading apparatus comprising the paper transport device according to claim 3.

9. A document reading apparatus comprising the paper transport device according to claim 4.

10. An image forming apparatus comprising the paper transport device according to claim 2.

11. An image forming apparatus comprising the paper transport device according to claim 3.

12. An image forming apparatus comprising the paper transport device according to claim 4.

* * * * *